L. G. COPEMAN.
GREASE CUP.
APPLICATION FILED AUG. 24, 1916.

1,222,185.

Patented Apr. 10, 1917.

INVENTOR
Lloyd G. Copeman
BY Raymond A. Parker
ATTORNEY

UNITED STATES PATENT OFFICE.

LLOYD G. COPEMAN, OF FLINT, MICHIGAN.

GREASE-CUP.

1,222,185.

Specification of Letters Patent.  Patented Apr. 10, 1917.

Application filed August 24, 1916. Serial No. 116,709.

*To all whom it may concern:*

Be it known that I, LLOYD G. COPEMAN, a citizen of the United States, residing at Flint, county of Genesee, State of Michigan, have invented a certain new and useful Improvement in Grease-Cups, and declare the following to be a full, clear, and exact description of the same, such as will enable others skilled in the art to which it pertains to make and use the same, reference being had to the accompanying drawings, which form a part of this specification.

This invention relates to grease cups and has for its object a grease cup which is arranged to operate upon a grease capsule and is provided with means whereby, when the contents of a capsule is exhausted, the plunger of the grease cup picks up the capsule so that the same can be removed with the plunger. This does away with the necessity of picking it out.

In the drawings,—

Figures 1, 2, 3:
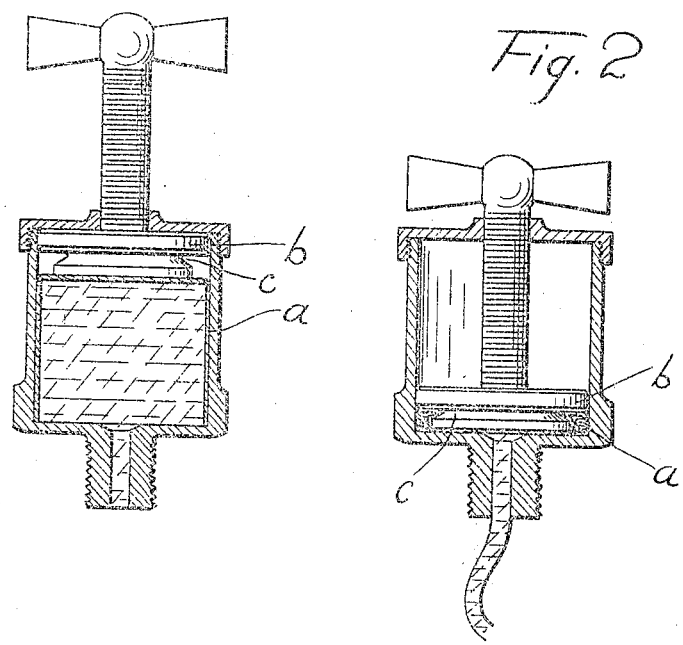
Figure 1 is a longitudinal section of the grease cup, showing the capsule before being collapsed.
Fig. 2 is a longitudinal section showing the capsule collapsed.
Fig. 3 is a section of the cap showing the stem and plunger in elevation and indicating how the plunger picks up the cap.

It is the trend in the development of grease cups to provide some convenient means for carrying the grease in the grease cup without soiling the fingers. To this end grease capsules have been designed and have been operated in the ordinary grease cups, but when the grease capsule is collapsed and the plunger is removed for the substitution of a new grease capsule, it is necessary to provide some tool to pick the capsule out. My plunger is so designed that when it has expelled or almost expelled the contents of the capsule, it automatically picks the same up.

$a$ is the grease capsule. The barrel of the grease cup, the exhaust orifice and the cap are sufficiently evident from the drawings to need no specification. $b$ is a plunger, to which my invention particularly relates. It will be seen that this plunger is provided with an outer end diameter which almost equals the inside diameter of the barrel for the purpose of providing a tight fit to prevent the grease from getting behind the plunger. The inner end of the plunger, however, is of less diameter and there is a reduced portion $c$ between the inner end of the plunger and the outer end, providing an annular recess $c$.

The operation of the device is evident from Fig. 2. As the plunger compresses the capsule as indicated in this figure, the lower end of the plunger is driven against the capsule and it is so spaced from the walls of the barrel as to allow a portion of the upper end of the capsule to drive in between the lower end of the plunger and the barrel and into the annular recess $c$. It is, therefore, evident that when the cap of the grease cup is unscrewed and the plunger lifted out, as shown in Fig. 3, the plunger will carry with it the collapsed grease capsule.

What I claim is:

1. The combination of a grease cup having a plunger, and means on the plunger for picking up a collapsed grease capsule.

2. A grease cup comprising a barrel, a plunger therein, and means on the inner end of the plunger in the way of a sidewise opening recess into which the grease capsule is forced upon the collapsing thereof so that when the plunger is drawn back the grease capsule follows the same.

3. The combination of a grease cup provided with a barrel, a plunger therein provided with an inner end slightly spaced from the walls of the barrel and provided with an annular recess between the lower and the upper end, the same operating to support the outer end of the collapsed grease capsule for drawing the same out of the barrel with the plunger.

In testimony whereof, I sign this specification.

LLOYD G. COPEMAN.

Witnesses:
ROY W. SCHUMACHER,
H. E. POTTER.